(12) United States Patent
Mc Kinnon et al.

(10) Patent No.: US 6,628,095 B1
(45) Date of Patent: Sep. 30, 2003

(54) ACTUATOR FOR REMOTE OPERATION OF A CIRCUIT BREAKER

(75) Inventors: Bruce Raymond Mc Kinnon, St Heliers (NZ); Owen Ross Gregory, Kihikihi (NZ)

(73) Assignee: Tyco Electronics Logistics A.G., Steinach (CH)

( * ) Notice: Subject to any disclaimer, the term of this patent is extended or adjusted under 35 U.S.C. 154(b) by 0 days.

(21) Appl. No.: 09/831,199

(22) PCT Filed: Nov. 8, 1999

(86) PCT No.: PCT/NZ99/00182
§ 371 (c)(1),
(2), (4) Date: Aug. 7, 2001

(87) PCT Pub. No.: WO00/28565
PCT Pub. Date: May 18, 2000

(30) Foreign Application Priority Data

Nov. 10, 1998 (NZ) ................................. 332731

(51) Int. Cl.[7] .......................... H02K 7/14; H01H 5/00; H01H 3/00
(52) U.S. Cl. ................ 318/3; 318/9; 200/400; 335/75
(58) Field of Search ................. 318/3, 9, 12, 14, 318/15; 200/329, 330, 331, 334, 336, 337, 400; 335/68, 69, 71, 72, 74, 75

(56) References Cited

U.S. PATENT DOCUMENTS

| | | | | |
|---|---|---|---|---|
| 3,328,731 A | * | 6/1967 | Huska | 335/74 |
| 3,559,121 A | * | 1/1971 | Powell et al. | 335/68 |
| 3,883,781 A | * | 5/1975 | Cotton | 335/68 |
| 3,893,050 A | * | 7/1975 | Salvati et al. | 335/69 |
| 4,121,382 A | * | 10/1978 | Dietrich et al. | 49/334 |
| 4,245,140 A | * | 1/1981 | Jencks et al. | 200/400 |
| 5,160,908 A | * | 11/1992 | Mullins et al. | 335/68 |
| 5,180,051 A | * | 1/1993 | Cook et al. | 200/400 |
| 5,641,059 A | | 6/1997 | Wilde et al. | 200/400 |
| 5,804,930 A | | 9/1998 | Panto | 318/3 |
| 5,808,532 A | * | 9/1998 | DiVincenzo et al. | 335/68 |
| 6,262,548 B1 | * | 7/2001 | Scholten et al. | 318/3 |
| 6,479,780 B2 | * | 11/2002 | Virtanen et al. | 200/400 |

FOREIGN PATENT DOCUMENTS

| EP | 797230 | 9/1997 | H01H/71/70 |
|---|---|---|---|
| JP | 10321111 A | * 12/1998 | H01H/73/02 |

* cited by examiner

*Primary Examiner*—Robert E. Nappi
*Assistant Examiner*—Edgardo San Martin
(74) *Attorney, Agent, or Firm*—Dean W. Russell; Kilpatrick Stockton LLP

(57) ABSTRACT

An actuator for remote operation of a switch, such as a recloser-type circuit breaker in a power distribution network, comprises an electric mechanism including an electric motor and electro-magnetic clutch mechanism, which is energisable to connect the motor drive to mechanically operate the switch on command and which is otherwise mechanically disengaged from the switch such that the switch may operate freely, and a receiver arranged to receive remotely transmitted command signals for the electric mechanism.

14 Claims, 2 Drawing Sheets

ACTUATOR FOR REMOTE OPERATION OF A CIRCUIT BREAKER

TECHNICAL FIELD

This invention comprises an actuator for remote operation of a circuit breaker, such as a recloser-type circuit breaker, in a power distribution network.

BACKGROUND

Circuit breakers are typically provided in power distribution networks to detect when a fault occurs and disconnect power from a section of the line to ensure the safe operation of the distribution system. One type of sectionaliser circuit breaker is known as a recloser. A recloser is configured to disconnect power to a distribution line or lines if it detects the occurrence of a fault. A recloser will normally break the power supply circuit if it detects a fault and then reconnect the circuit again after a short delay. If the fault is still present, the recloser will again disconnect the supply circuit and then reconnect it after another delay period. If the fault is still present on the line after the second reconnection, this will trigger the recloser into again disconnecting the power supply circuit and a manual override switch on the recloser will be disengaged. Once the manual override switch has disengaged (which in commonly used forms of recloser is indicated at the exterior of the recloser by a flag or lever being dropped downwards) the power distribution circuit cannot be reconnected until the manual override switch is physically moved into its engaged position by a technician or linesman.

Most reclosers also include a manually actuated non-reclose lever. If this lever is operated by a linesman or technician the manual override lever will automatically disengage the first time a fault is detected on a power distribution line. This non-reclose lever is used when a technician or linesman is trying to determine the location of a fault and does not wish the recloser to automatically reconnect the power after a short delay.

U.S. Pat. No. 5,641,059 describes an actuator which is coupled to a recloser and which can be controlled over a radio link to enable remote operation of the recloser. This remotely controlled actuator comprises driving motors to drive an actuator arm that operates the manual controls of the recloser, to eliminate the need for a technician to travel out to the site of the actuator. However, in this form of remote control actuator an actuator arm is driven upwards and downwards by a direct link to an electric motor and it has been found that if the electric motor or its controlling circuitry fails, it is possible that the motor will drive the actuator arm up to a position where it will permanently jam on the manual override lever of the recloser. This situation is referred to as the recloser lever being "hung up". The effect can be that the recloser cannot operate as normal and shut off or break the power supply to the line in the event of a fault. This may result in the recloser exploding, damage to the power distribution line, or even a blackout.

SUMMARY OF INVENTION

In broad terms in one aspect the invention comprises an actuator for remote operation of a switch, comprising an electric mechanism which is energisable to mechanically operate the switch on command and which is otherwise mechanically disengaged from the switch such that the switch may operate freely, and a receiver arranged to receive remotely transmitted command signals for the electric mechanism.

In broad terms in a further aspect the invention comprises an actuator for remote operation of a circuit breaker, comprising an electric motor and an electro-magnetic clutch mechanism which is energisable to connect the motor drive to mechanically operate the circuit breaker and which is otherwise disengaged such that the circuit breaker may operate freely, and a receiver arranged to receive remotely transmitted control signals and control operation of the electric motor and electro-magnetic clutch to operate the actuator.

In one preferred form the invention comprises an actuator for remote operation of a recloser-type circuit breaker comprising manual override and non-reclose controls, comprising one electro-magnetic clutch mechanism energisable to connect a mechanical drive to operate the manual override control and which is otherwise disengaged such that the manual override control may move freely, a second electro-magnetic clutch mechanism energisable to connect a mechanical drive to operate the non-reclose control and which is otherwise disengaged such that the non-reclose control may move freely, and a receiver arranged to receive remotely transmitted control signals and control operation of the mechanical drive and electro-magnetic clutch mechanisms to enable remote operation of the circuit breaker.

The actuator of the invention is particularly intended for use with pole-top mounted recloser-type electrical circuit breakers but may be used with any other form of circuit breaker which term should be understood as arranged to interrupt or reconnect the supply of electrical power in a power distribution network including for example ring main units, gas switches, air brake switches, or similar.

The actuator may be a separate unit which is adapted to be retro-fitted to existing circuit breakers such as pole-top recloser-type circuit breakers in a power distribution network, and in particular be coupled to the manual override and non-reclose controls of an existing recloser for example, or may alternatively be incorporated as an integral part of original equipment remotely operable circuit breaker.

BRIEF DESCRIPTION OF DRAWINGS

The invention is further described with reference to the accompanying drawings which show a preferred form actuator of the invention by way of example and without intending to be limiting. In the drawings.

DETAILED DESCRIPTION OF PREFERRED FORM

Figure 3:
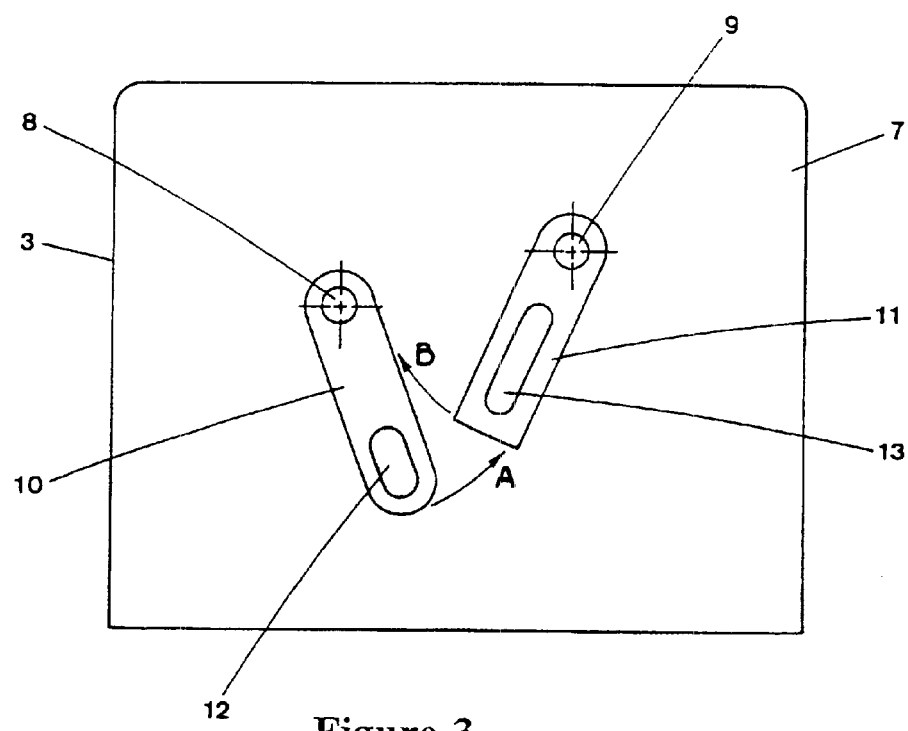
FIGS. 3 and 4 are views of the back face of the preferred form actuator unit removed from the recloser and showing the arms of the preferred form actuator which couple to the manual override and non-reclose levers of the recloser, in their tripped position in FIG. 3 and in their normal position in FIG. 4.

The preferred form actuator is particularly intended for use with a recloser-type circuit breaker indicated at 1. The preferred form actuator comprises a unit 3 which may be retrofitted to the recloser by being bolted or otherwise secured to the housing at 2. The actuator 3 comprises on the back face of the actuator shafts 8 and 9 (see FIGS. 3 and 4)

which couple to the existing manual override and non-reclose levers of the circuit breaker, so that the remotely controlled actuator may operate the manual override and non-reclose controls of the recloser.

In the preferred form actuator, override and non-reclose levers 4 and 5 are provided on the outside of the front face 6 of the actuator unit which are visually similar to the manual override and non-reclose levers which normally project from the existing recloser 2 to indicate as before the position of the manual override and non-reclose levers, and enabling a linesman on site to also manually operate the recloser via the manual arm and non-reclose arms 4 and 5, as well as allowing remote operation of the recloser via the actuator unit of the invention.

Figure 1:
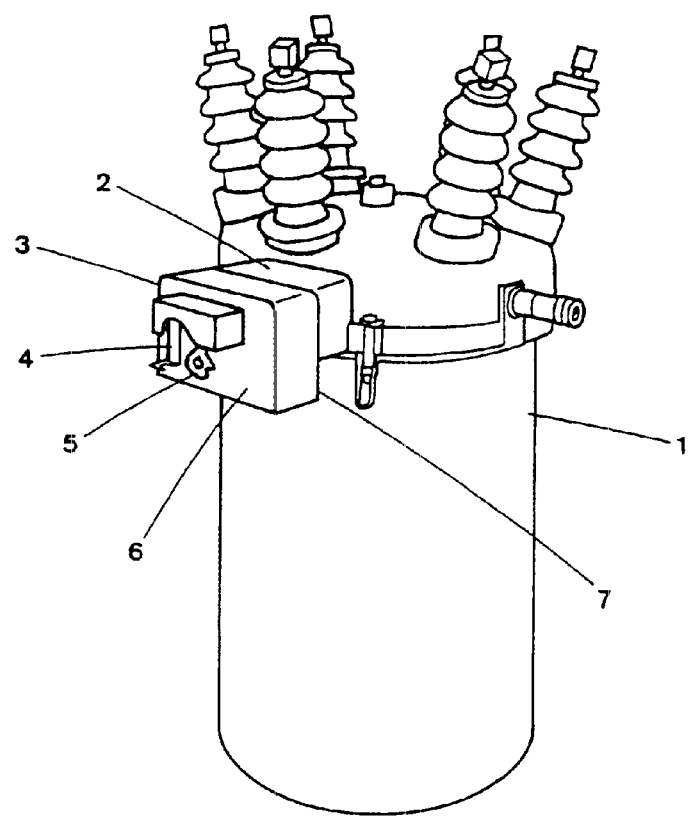
FIG. 1 shows a pole-top mounted recloser-type circuit breaker, having an actuator of the invention retrofitted to the recloser.
Figure 2:
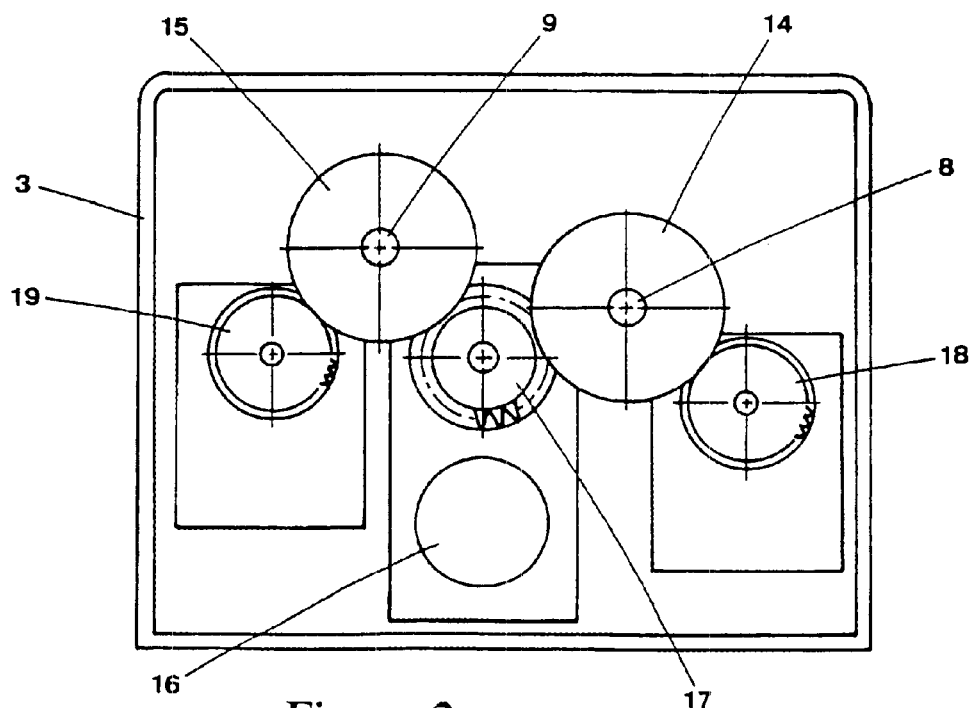
FIG. 2 shows the internal components of the preferred form actuator with the front cover of the actuator unit removed.

FIG. 2 shows the internal components of the actuator. The preferred form actuator comprises a housing including a front cover 6 and back plate 7, and FIG. 2 shows the interior of the actuator unit with the front cover 6 removed. Shafts 8 and 9 journalled within the actuator project through the back plate 7, and arms 10 and 11 are coupled to the ends of the shafts 8 and 9 on the outside face of the back plate as shown (see FIG. 3). When the actuator unit is fitted to the existing recloser the arms 10 and 11 couple to the existing manual override and non-reclose controls of the recloser. For example, stub shafts may be prefixed to the manual override and non-reclose levers during installation which will protrude through slots 12 and 13 in the arms 10 and 11. When the existing front cover of the recloser 2 is removed and the actuator unit 3 bolted in place, the manual override and non-reclose control mechanisms of the existing recloser will couple to the arms 10 and 11 via the slots 12 and 13, but any other suitable arrangement for coupling the actuator to the existing manual override and non-reclose controls may alternatively be employed.

Figure 4:
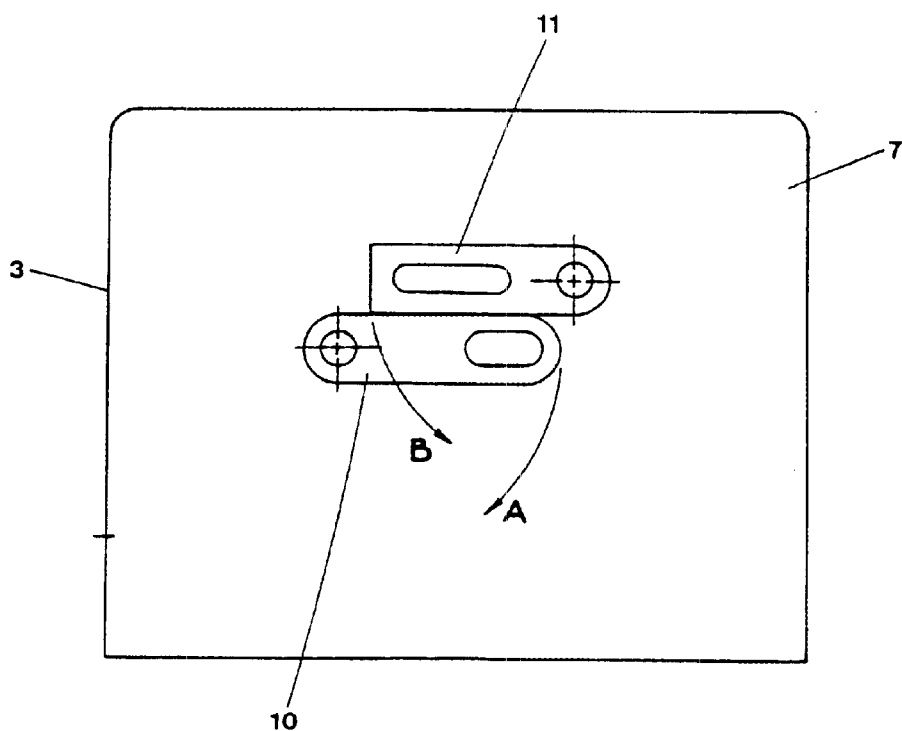

Electro-magnetic clutches 14 and 15 are carried by shafts 8 and 9, within the interior of the actuator unit. In the preferred form conventional electro-magnetic clutches are used, each comprising a first component in the form of a gear which is free wheel mounted on the shafts 8 and 9, and a second component which is fixed to the shafts 8 and 9 and incorporates electro-magnetic coils. The actuator comprises a single electric motor 16, the output shaft of which is via idler gear 17 geared to the gear components of the clutches 14 and 15, and the arrangement is such that when the motor 16 is driven and one or other or both of the clutches is/are energised, the rotary drive will be connected through to one or other or both of the shafts 8 and 9 to rotate the shafts and thus move the arms 10 and 11 of the actuator unit to operate the manual override and non-reclose functions of the existing recloser. FIG. 4 shows the arms 10 and 11 in their normal positions. They may be moved by the actuator in the direction of arrows A and B to the positions shown in FIG. 3, in which the arms are so positioned that the manual override and non-reclose levers will both be actuated, and back to the normal positions shown in FIG. 4.

The actuator also comprises signal receive and control electronics (not shown) which are arranged to operate the electric motor and electro-magnetic clutches 14 and 15. For example, the control unit may comprise a programmable logic controller and where signals (including signal addressing data) are transmitted by radio the PLC may be preceded by a radio receive stage with associated aerial. Rotary position indicators are also coupled to each of the shafts 8 and 9 via gears 18 and 19, to provide an indication to the PLC of the rotational position of the shafts 8 and 9 at any time, and thus of the manual override and non-reclose arms 10 and 11 of the actuator. The actuator may be remotely controlled to operate either of the manual override or non-reclose levers. The arrangement is such that the electro-magnetic clutches 14 and 15 will be disengaged or will disengage when there is no power to the actuator or there is a failure within the actuator so that the manual override and non-reclose functions of the existing recloser will not be impeded and will be able to operate freely, so that the actuator will not cause "hanging up" of the recloser.

In a number of different circuit breakers the switches or levers are spring loaded, so that the controls are actuated against the force applied by the loading spring. If the clutch releases too quickly, the stored energy in the controlled spring may force the control back into its original position, and thus preferably the electro-magnetic clutches are chattered by the controller by being engaged and disengaged relatively quickly, to create a braking effect against the force applied by the loading spring.

The preferred actuator described above is intended for retrofitting to existing reclosers, but alternatively an actuator of the invention may be fitted as original equipment to an existing recloser or other circuit breaker as part of the original equipment item. The preferred form actuator is described with reference to the remote actuation of the manual override and non-reclose levers of a recloser-type circuit breaker, but an actuator of the invention may be arranged to control one or more mechanical levers, switches, buttons, or similar of any other form of electrical circuit breaker including mechanical ring main unit, gas switch, air break switch, or the like.

In the preferred form the electro-magnetic clutch mechanisms comprise a geared component driven by the electric motor 16 and a second component fixed to the shaft 8 or 9, both of which are mounted about the shafts 8 or 9, but in another arrangement the electro-magnetic clutch mechanism may for example comprise a solenoid adapted to move a shaft longitudinally to connect or disconnect drive from an electric motor to a lever switch, button, or similar.

The foregoing describes the invention including a preferred form thereof by way of example. Alterations and modifications as will be obvious to those skilled in the art are intended to be incorporated within the scope hereof as defined in the accompanying claims.

What is claimed is:

1. An actuator for remote operation of a switch, comprising an electric mechanism comprising an electric motor and an electro-magnetic clutch mechanism which is energisable to connect the motor drive to mechanically operate the switch on command and which is otherwise mechanically disengaged from the switch such that the switch may operate freely, and a receiver arranged to receive remotely transmitted command signals for the electric mechanism.

2. An actuator according to claim 1 wherein the clutch mechanism is mounted about a shaft which is caused to rotate when the electric motor is driven and the clutch is energised, to operate the switch.

3. An actuator according to claim 2 wherein said shaft carries an arm which is coupled to the switch and which is moved when the electric motor is driven and the clutch is energised, to operate the switch.

4. An actuator according to claim 1 in which the switch is a circuit breaker.

5. An actuator according to claim 1 comprising a unit adapted to be retrofitted to an existing pole-top circuit breaker in a power distribution network.

6. An actuator according to claim 1 which is also manually operable from the exterior of the actuator.

7. An actuator for remote operation of a recloser-type circuit breaker comprising manual override and non-reclose controls, comprising one electro-magnetic clutch mechanism energisable to connect a mechanical drive to operate the manual override control on command and which is otherwise disengaged such that the manual override control may move freely, a second electro-magnetic clutch mechanism energisable to connect a mechanical drive to operate the non-reclose control and which is otherwise disengaged such that the non-reclose control may move freely, and a receiver arranged to receive remotely transmitted control signals and control operation of the mechanical drive and electro-magnetic clutch mechanisms to enable remote operation of a circuit breaker.

8. An actuator according to claim 7 wherein said mechanical drive is provided by an electric motor and said one electro-magnetic clutch mechanism is mounted about a shaft which is connected to the manual override control and which is caused to rotate when the electric motor is driven and the clutch is energised, to operate the manual override control.

9. An actuator according to claim 7 wherein said mechanical drive is provided by an electric motor and said second electro-magnetic clutch mechanism is mounted about a shaft which is connected to the non-reclose control and which is caused to rotate when the electric motor is driven and the clutch is energised, to operate the non-reclose control.

10. An actuator according to claim 8 wherein said shaft carries an arm which is rotated through an arc to operate the manual override control.

11. An actuator according to claim 9 wherein said shaft carries an arm which is rotated through an arc to operate the non-reclose control.

12. An actuator according to claim 7 comprising controls on the exterior of the actuator which enable manual operation by a linesman of the manual override and/or non-reclose controls.

13. An actuator according to claim 7 comprising position indicators on the exterior of the actuator which visibly indicate the status of the manual override and/or non-reclose controls.

14. An actuator according to claim 7 adapted to the retro-fitted to an existing recloser-type circuit breaker having externally operable manual override and non-reclose levers and comprising manual override and non-reclose levers on the exterior of the actuator which enable manual operation of the manual override and non-reclose controls by a linesman and have an appearance similar to the original manual override and non-reclose levers of the circuit breaker.

\* \* \* \* \*